United States Patent [19]

DiPalma et al.

[11] 4,266,724
[45] May 12, 1981

[54] MOBILE SPRAYING APPARATUS WITH AN AXIAL PIPE-CARRIER DRUM

[75] Inventors: Hugo R. DiPalma, "Cavalle", Duras, France, 47120; Francis C. Aubarède, Duras, France

[73] Assignee: Hugo R. DiPalma, Duras, France

[21] Appl. No.: 46,312

[22] Filed: Jun. 7, 1979

[30] Foreign Application Priority Data

Jun. 7, 1978 [FR] France .................. 78 17028

[51] Int. Cl.³ ................................. B05B 3/18
[52] U.S. Cl. .................... 239/195; 239/183; 239/191; 239/709; 137/355.12
[58] Field of Search ........ 239/178, 183, 187, 188–192, 239/195–199; 137/344, 355.12, 355.26

[56] References Cited

U.S. PATENT DOCUMENTS

| 726,580 | 4/1903 | Shannon | 137/355.12 X |
| 3,317,143 | 5/1967 | Turner | 239/191 X |
| 3,478,964 | 11/1969 | Karmann | 239/191 |
| 3,753,409 | 8/1973 | Frazier | 239/198 X |
| 3,913,837 | 10/1975 | Grant | 239/198 |

Primary Examiner—Robert W. Saifer
Attorney, Agent, or Firm—Schwartz, Jeffery, Schwaab, Mack, Blumenthal & Koch

[57] ABSTRACT

A spray irrigation apparatus including a vehicle which carries a spraying nozzle connected to a hollow shaft of a drum reel, a pipe being connected to the hollow shaft and being wound onto the drum reel. The pipe is dispensed from the reel by means of a reeling guide structure which causes the pipe to move from the reel in a curved path so that the pipe passes from a direction perpendicular to the axis of the reel to a direction parallel to the displacement of the apparatus. That end of the pipe which extends from the apparatus is connected to a water supply station so that the apparatus is supplied with water for spraying onto a field or the like. According to a further feature of the invention, the axis of rotation of the drum reel extends along the direction of movement of the apparatus.

16 Claims, 9 Drawing Figures

FIG_1

FIG_2

FIG_9

MOBILE SPRAYING APPARATUS WITH AN AXIAL PIPE-CARRIER DRUM

The present invention concerns irrigation by spraying.

Spraying apparatuses are already known, which are moved automatically over a given path. The power of water under pressure is often used for this purpose. The apparatus is connected to a water supply station on the site, relative to which it is moved in the course of the spraying operation. By virtue of this displacement, the length of the pipe required for connecting the apparatus to the water supply station varies. A large reel or drum which is mounted rotatably about a transverse axis on the apparatus then serves as a pipe store and permits the variation in the length of pipe. The drum winds on or unwinds the pipe, depending on whether the spraying operation is being performed when the apparatus is moving towards or moving away from the water supply station. Moreover, like the movement of the apparatus, the rotary movement of the drum may utilise the power of pressurised water.

The chassis of apparatuses of this kind must be relatively narrow in order to permit it to be moved on the road. It is also desirable for the apparatus to have a large operating radius and consequently to be able to wind on a substantial length of pipe.

As the drum is mounted transversely on a narrow carriage, the drum is also narrow. It must therefore be of large diameter if it is to wind on a long length of pipe. This raises the centre of gravity of the apparatus and impairs its stability, more particularly on sites which are not perfectly flat.

The aim of the present invention is in particular to remedy this disadvantage. It is also concerned with the preferential use of a pipe of flexible material. It is further concerned with providing for the flexible pipe to be wound on the drum, under a controlled tension and in regular layers, so as to improve the service life of the pipe.

For this purpose, the invention proposes a spraying apparatus wherein a chassis which is movable in a general direction defined by wheels carries:

a spray means, a reel which forms a rotary store for a pipe which on the one hand is permanently connected to the spray means and issues on the other hand from the reel and the apparatus so as to be capable of connection to an external supply station, a reeling guide means comprising a carriage which co-operates with the pipe as it leaves the reel and which is displaced with respect to the chassis in dependence on rotation of the reel, the carriage varying the point at which the pipe is engaged on the reel so that it is disposed thereon in regular layers, and means for driving the apparatus and the reel in order to adjust the length of pipe which is unwound between the supply station and the apparatus when the apparatus is displaced.

In accordance with a feature of the invention, the axis of rotation of the reel is substantially parallel to the direction of displacement of the apparatus and the chassis of the apparatus is provided with means for guiding the pipe, said means being capable of defining for the pipe an incurvated path which passes from a direction substantially perpendicular to the axis of the reel, where the pipe leaves the reel, to a direction which is substantially parallel to the direction of displacement of the apparatus, when the pipe issues from the apparatus.

In a very advantageous manner, the pipe guide means comprise at least one roller which is mounted on the carriage of the reeling guide means and over which the pipe passes.

In one embodiment, the reeling guide means extends on one side of the apparatus, parallel to the axis of rotation of the reel. As the chassis is supported by two pairs of wheels, one pair at the front and the other pair at the rear, where the pipe issues from the apparatus, the pipe guide means further comprise a relay roller so positioned that the pipe is unwound on the ground in the vicinity of the line of one of the wheels. With large wheels as the front wheels, and with small wheels as the rear wheels, the relay roller preferably supports the pipe above one of the small rear wheels, and the pipe is unwound on the ground, in the line of that wheel.

In this way, the free area to be provided on the ground for the movement of the apparatus thereon is virtually limited to the lines of the wheels.

Advantageously, the means for driving the apparatus and the reel comprise a motor, a first mechanical connection between the motor and the drive wheels of the chassis, and a second mechanical connection, which permits slip, between the motor and the reel and the reeling guide means, while a means which is sensitive to the pulling force applied to the pipe is provided on the path of the pipe, said means controlling the slip in the second mechanical connection so that the pipe is wound on under a substantially constant tension.

In a particular embodiment, the reeling guide means comprises an endless chain which is driven at the same time as the reel and which is provided with a lug which entrains a carriage which is movable on straight guides, said carriage carrying the incurvated pipe guide means, at least partially. The means which is sensitive to the pulling force applied to the pipe may then be mounted on the carriage of the reeling guide means and may comprise a lever which is pivotal on said carriage about an axis substantially perpendicular to the axis of the reel, said lever supporting at least one roller for providing the incurvated guide action for the pipe; at least one supplementary roller rests on the pipe, on the exit side of the apparatus. The pulling force-sensitive means may also be mounted on the portion of the pipe which issues from the apparatus, behind the rear wheels.

In turn, the slip action provided in the second mechanical connection may be provided by a clutch. The slip action may also be provided by slackening off a tensioning roller which is disposed on a belt drive for the reel and for the reeling guide means.

Very advantageously, the motor for driving the apparatus and the reel is a hydraulic motor which is actuated by the pressurised spraying liquid, spraying being effected as the pipe is wound on and as the apparatus is moved towards the water supply station, under the action of the hydraulic motor.

Preferably, an independent drive motor is also added thereto, said independent drive motor being capable of driving one at least of the components comprising the drive wheels and the reel. The independent motor may then replace the hydraulic motor under certain circumstances, in particular for distributing liquid manure.

In accordance with another aspect of the invention, the apparatus comprises a directional guide means for the carriage, comprising a sensing arm which co-operates with the portion of the pipe which is unwound on the ground.

In accordance with yet another aspect of the invention, the pipe is made of flexible material and is provided at its ends with non-return valves which normally keep it under pressure. This considerably facilitates the operations of winding on and unwinding the pipe when the apparatus is not connected to the water supply station. Moreover, the flexible pipe substantially facilitates the task of the incurvated guide means according to the invention.

Other features and advantages of the invention will be apparent from the detailed description given hereinafter with reference to the accompanying drawings which are given by way of non-limiting example and in which.

We shall first describe a first embodiment of the invention and an alternative form thereof, wherein the reeling guide means carries incurvated means for guiding the pipe, which also provide the function of detecting the pulling force applied to the pipe.

Figure 7:
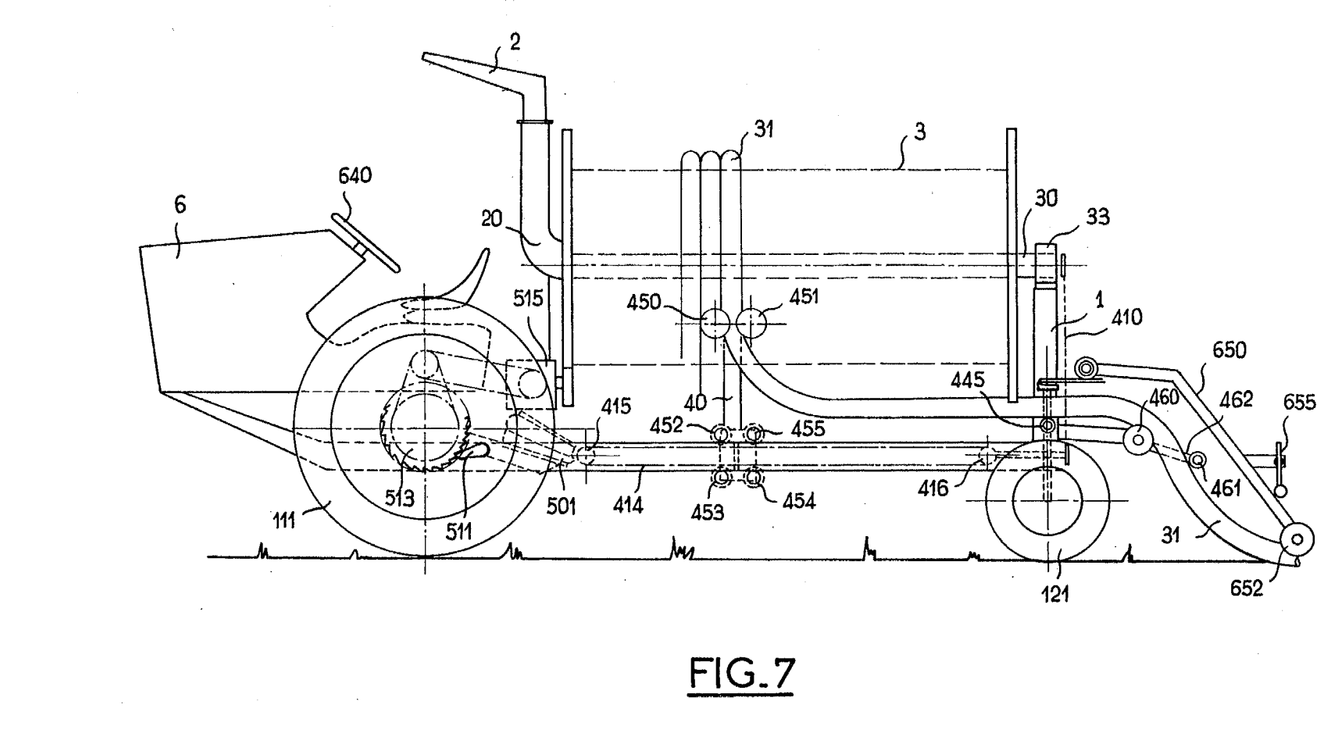
FIG. 7 shows a side view of a second embodiment of the apparatus according to the invention.
Figure 8:
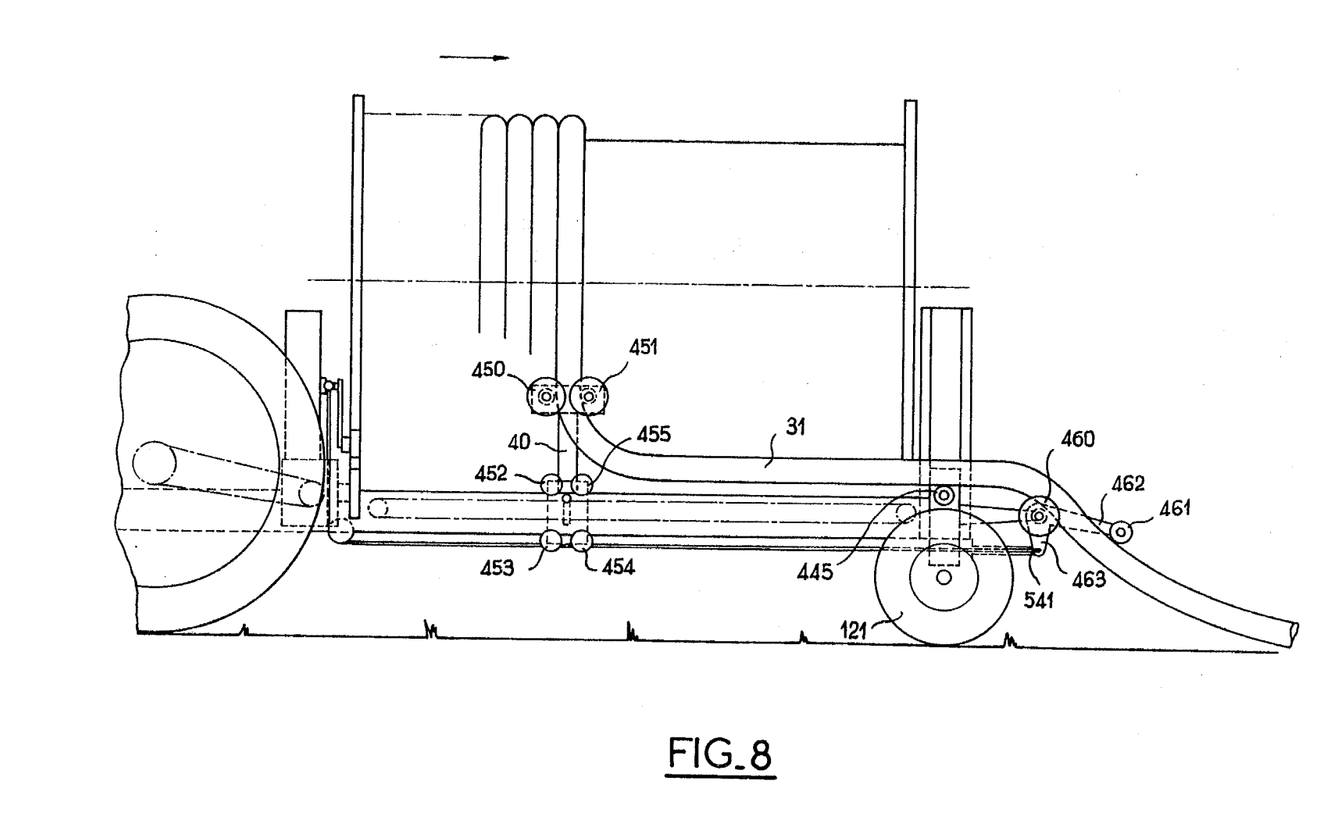
FIG. 8 is a diagrammatic side view of part of the apparatus according to the invention as shown in FIG. 7.
Figure 9:
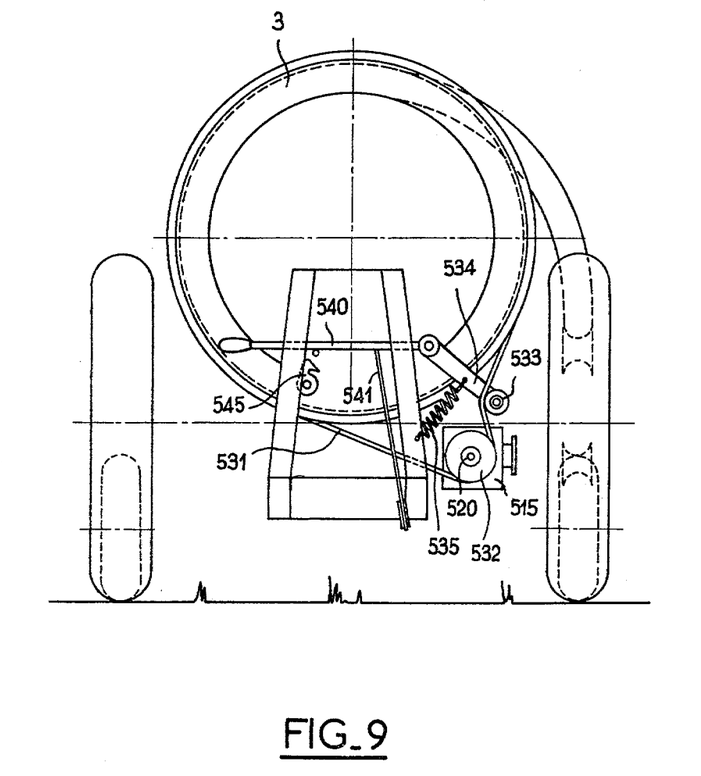
FIG. 9 is a diagrammatic view of part of the same apparatus, seen from the right, without the engine block or the piloting station.

The second embodiment shown in FIGS. 7 to 9, in contrast, separates the incurvated pipe guide function and the pulling force detection function which is thus effected at another point on the chassis of the apparatus, advantageously rearwardly of the rear steering wheels, the apparatus being provided with a directional guide means which bears on the pipe.

The first embodiment of the spraying apparatus according to the invention is shown in FIGS. 1 to 4.

The apparatus comprises a chassis 1 provided with a pair of large wheels 110 and 111 at the front, and a pair of small steering wheels 120 and 121 at the rear (the front being defined according to the position of the piloting station). The apparatus is moved in the general direction defined by the large wheels 110 and 111, except for corrections in its direction.

Mounted on the chassis is a spray means which in this embodiment is formed by a nozzle or cannon 2 for spraying in a circular arc. The nozzle is connected by an elbow-bent conduit 20 to the hollow shaft 30 of a drum 3 which carries a pipe 31 whose inside end, wound on the drum, communicates with the hollow shaft 30 and by way thereof, with the nozzle 2. The drum is mounted rotatably in bearing members 32 and 33 which are fixed with respect to the chassis 1.

On issuing from the drum, the pipe meets a reeling guide means 4 which permits the pipe to be wound on the drum and unwound from the drum in regular layers, and which will be described in greater detail hereinafter.

The pipe then issues from the apparatus in a rearward direction, in order to go to the water supply station to which it is connected.

The apparatus is provided with a hydraulic motor 5 and in most cases an independent drive motor 6 such as an internal combustion engine. The latter actuates a gearbox 60 whose output shafts 610 and 620 are connected by way of reducing units 611 and 621 to shafts 612 and 622 of the large wheels 110 and 111. The piloting station comprises a seat 63 and a steering wheel 640 which controls a steering box 641 whose output shaft 642 is provided with a lever 643. Pivotally connected to the lever 643 is rod 644 which is also connected to the lever 645 which is pivoted on the chassis at 646 and which controls one of the steering wheels 120. The lever 646 is connected to the lever 647 of the other steering wheel 121 by an adjustable bar 648.

Figure 1:
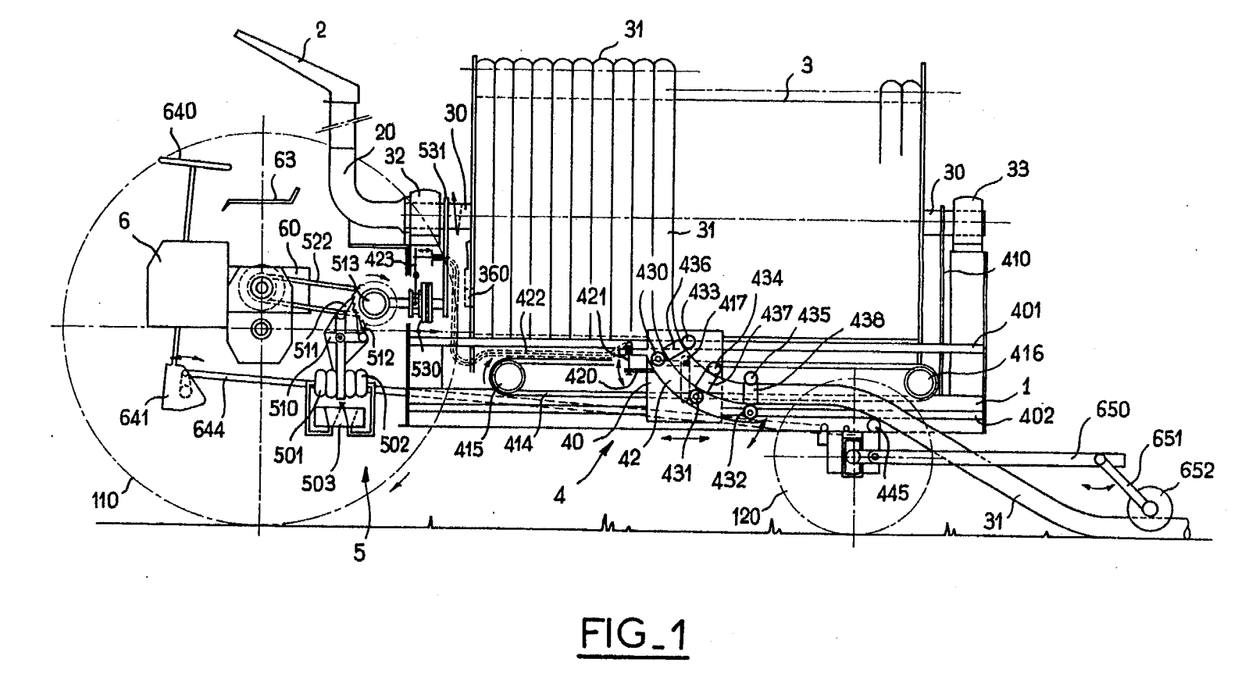
FIG. 1 is a side view of a first embodiment of the apparatus according to the invention.
Figure 2:
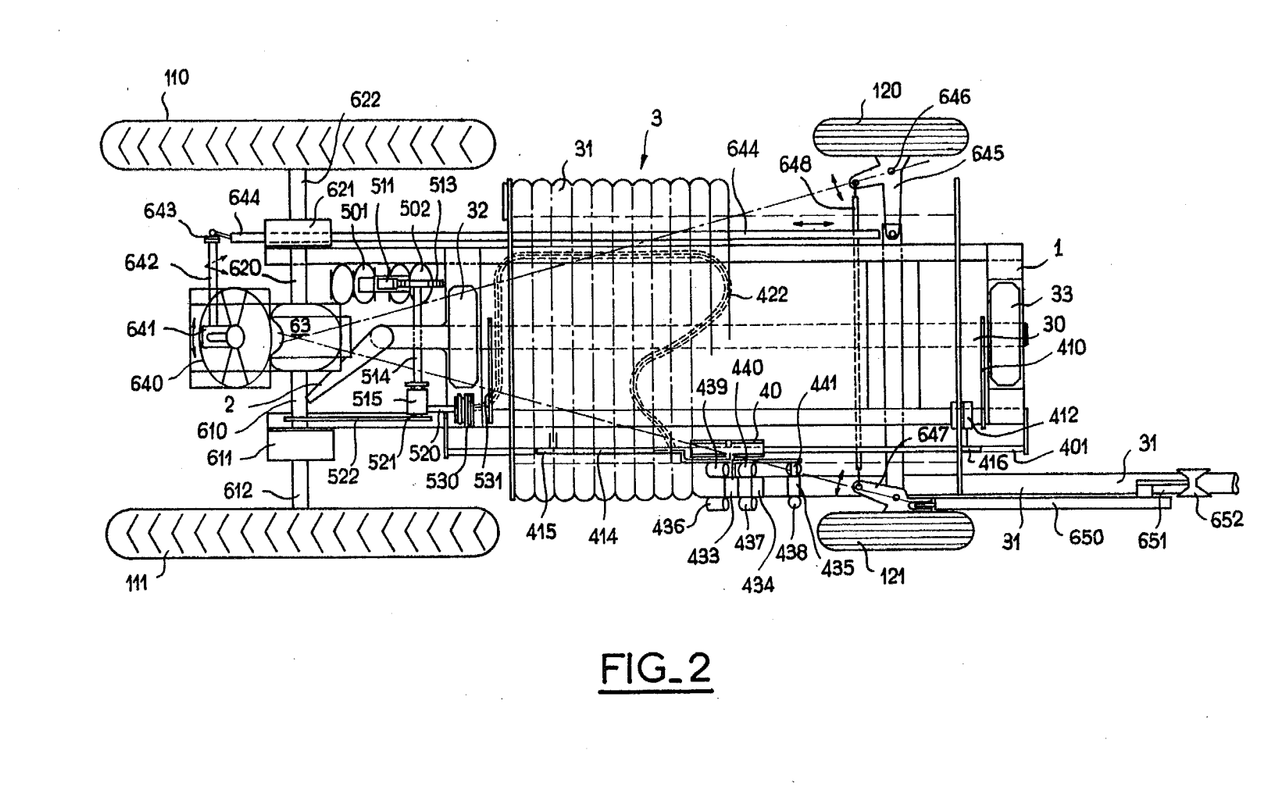
FIG. 2 is a plan view from above of the FIG. 1 apparatus.

In FIGS. 1 and 2, the hydraulic motor 5 comprises a jack means which in this embodiment comprises two jacks 501 and 502. A conduit (not shown) connects the pipe 20 or the shaft 30 to a distributor 503 which alternately supplies the jacks 501 and 502 with pressurised water. The two jacks act jointly on a cross-shaped lever 510 whose two arms are provided with pawls 511 and 512 which alternately cause a ratchet wheel 513 to be advanced. It will be seen from FIG. 2 that the ratchet wheel 513 drives a shaft 514 which controls a bevel gear assembly 515. The bevel gear assembly has two output shafts 520 and 521. The shaft 520 provides for driving the drum in rotation, in a manner which will be described hereinafter, while, by way of a chain 522, the shaft 521 drives the half-shaft 610 which is connected to the drive wheel 111, thereby permitting displacement of the apparatus, the dog clutches of the gearbox being locked in that case.

Although it is possible to envisage other modes of operation in accordance with the invention, the apparatus described herein is primarily intended to provide for spraying as the pipe is wound on to the drum, as the apparatus moves towards the water supply station.

In the prior art apparatuses, the axis of the drum is disposed transversely to the apparatus. In accordance with the present invention, the axis extends longitudinally, substantially at the center of the apparatus, and the drum is low, which makes the apparatus highly stable in the course of spraying over 180°.

This novel arrangement is permitted by a particular arrangement of the reeling guide means and the drive for the drum. It will be seen from FIGS. 1 and 2 that the output shaft 520 of the bevel gear assembly 515 controls a clutch means 530 which, as will be seen hereinafter, makes it possible to cause a slip to occur in the drive to the reel, relative to the displacement of the apparatus.

This is important in order to ensure that a flexible pipe is satisfactorily wound on under a low degree of tension, and also in order to take account of the fact that each fresh layer of pipe which is wound on the reel is of larger diameter than the previous layer, and consequently requires the reel to rotate at a lower speed. This is permitted by slipping of the clutch, which will occur from time to time or else continuously.

The output of the clutch means in turn acts by way of a chain 531 and pinions to rotate the shaft 30 of the reel 3. At its other end, the shaft 30 in turn drives the carriage 40 of the reeling guide means, by way of the chain 410, the bevel gear assembly 412 and the endless chain 414 which extends around two pinions 415 and 416 snd carries a lug 417 engaging into a slot in the carriage 4. In turn, the carriage slides on guides 401 and 402 which are parallel to the axis of the drum and to the direction of the endless chain, so that it can be displaced over the entire working length of the drum 3.

In this first embodiment, the reeling guide means provides for two functions: curving the path of the pipe, and detecting the tension thereof.

For this purpose, it carries a lever 42 which is mounted pivotally at 420 on the carriage. The lever carries incurvated pipe guide means in order to cause the pipe to pass from a direction in which it is virtually perpendicular to the axis of the reel, to a direction in which it is virtually parallel to the direction of displacement of the apparatus. In addition, because of its pivotability, the lever 42 detects the pulling force applied to the pipe. When the pulling force becomes excessive, a cable 421 secured to a rod 420 which is fixed with respect to the lever 42 and which passes through a sheath 422 actuates the lever 423 which causes progressive declutching of the reel, until the tension in the pipe becomes normal again, after the apparatus has moved forward a little towards the water supply station. A manually actuated brake 360 which acts on the periphery of the drum brakes the free unwinding movement of the pipe, without producing an excessive tension in the pipe.

In this embodiment, the pipe guide means comprise three arcuate means which are fixed on the lever 42 and which are formed by lower horizontal rollers 430 to 432, upper horizontal rollers 433 to 435, and inclined complementary rollers 436 to 438 and 439 to 441 (FIGS. 1 and 2). This therefore provides for the pipe to be turned virtually to a right angle, without causing damage thereto.

As regards the function of guiding the pipe in a curve, it is sufficient to use a single roller, possibly with guide wall members. However, it is preferable to use rollers which guide the tube over a substantial part of its periphery; either at least one group of four cylindrical rollers as shown in FIGS. 1 and 2, or a pair of rollers with a concave periphery, as will be seen with reference to FIGS. 7 to 9. Moreover, when the reeling guide means carries the means for detecting the tension in the pipe, it is desirable for it to comprise at least one other roller which is disposed at a spacing from the first rollers, preferably at least another group of four cylindrical rollers or at least one other pair of rollers with a concave groove therein.

When the apparatus uses groups of cylindrical rollers, the rollers are mounted on four shafts which are fixed relative to each other in a square or a rectangle which is secured to the reeling guide carriage or to the lever for detecting the pulling force in the pipe, when the lever is mounted pivotally on the reeling guide carriage.

The pipe guiding action is completed by a roller 445 which supports the pipe to pass it over the axle of the starting wheels such as 120, at least when the pipe passes between the steering wheels.

In this way, the pipe is deposited in a fixed position relative to the chassis. It can therefore serve as a reference for precisely guiding the apparatus in the appropriate direction. For this purpose, a lever 650 which is pivoted on the steering lever 647 carries a lever 651 which is urged resiliently downwardly in order to cause a grooved roller 652 to bear against the pipe 31. This means, which is conventional per se, gives better results according to the invention, because the pipe is laid down in a fixed position relative to the wheels.

The apparatus according to the invention also has the advantage that the reeling guide means operates both for winding on the pipe and for unwinding the pipe, which therefore makes the unwinding operation much more regular than with the prior art apparatuses, while ensuring that the pipe is laid down in a fixed position relative to the wheels, in both cases.

In an example of use of the apparatus, with the pipe being assumed to be wound on the drum at the start, the operator moves the apparatus, by means of the internal combustion engine, to a water supply station. There, the pipe is connected to the water supply, the drive for the reel is declutched, the reel is braked so as not to unwind successively quickly, and the operator moves the apparatus away until the pipe has been completely (or partially) unwound. The pipe unwinds very regularly due to the reeling guide means. After that, the internal combustion engine is stopped, the clutch is operated to connect the reel to the drive, the spraying means is set in operation, as well as the hydraulic motor, and the apparatus automatically sprays the area, while winding the pipe on to the drum and while moving towards the water supply station, being guided by the roller 652 which bears on the pipe itself. At the end of the field, the apparatus is stopped automatically, for example by detecting a stop member on the ground.

Although the foregoing mode of use is preferred at the present time, others may also be envisaged. For example, once the apparatus is at the water supply station, it may be caused to spray the area while the pipe is being unwound, under the action of the hydraulic motor. In that case, the guiding action may be provided by a plough member or shoe which co-operates with a furrow formed in the ground, by a cable, or by any equivalent means. After that, the pipe will be wound on the drum for example by means of the internal combustion engine, by way of a mechanical connection (not shown). The two operations may also be combined, that is to say, spraying while the pipe is being wound on the drum and then spraying while the pipe is being unwound, for example in the manner described in French Pat. No. 76 23 022 and its addition No. 77 22 509, to which reference will be made in order better to appreciate all the possible variations in the invention.

The apparatus of the invention may operate with a semi-rigid pipe, but at the present time a flexible pipe is preferred. The pipe may be wound on the drum when it is in a flat condition, that is to say, when it is not under pressure.

However, the apparatus functions even better if the pipe is kept constantly under pressure, this advantageously being achieved by two non-return valves which are permanently mounted at each of its ends.

The apparatus shown in FIGS. 1 to 4 may pass between two growing areas; in fact, the drum, being disposed transversely, may be long and narrow as a small diameter is sufficient by virtue of the long length of drum which is available for winding on the pipe.

Figure 3:
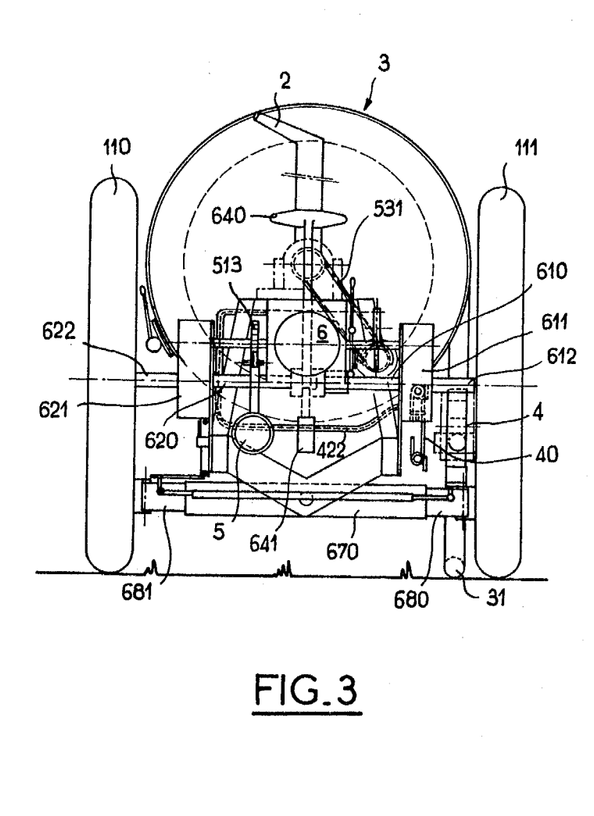
FIG. 3 is a view of the apparatus from the left-hand side in FIG. 1.
Figure 4:
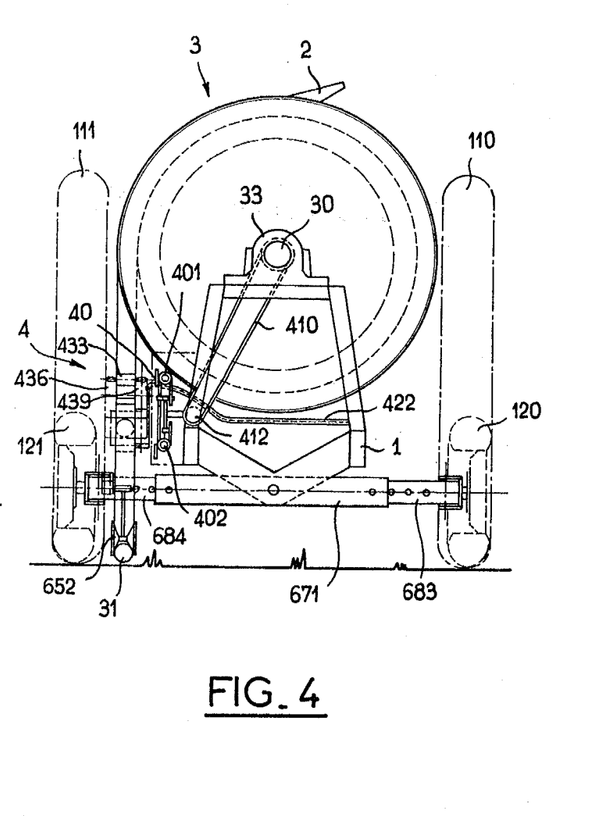
FIG. 4 is a view of the FIG. 1 apparatus from the right-hand side in FIG. 1.

Moreover, the apparatus may easily be converted so as to straddle crops, by adapting the transmission and steering connections between the chassis and the wheels. Such adaptation is moreover not absolutely necessary for use in relation to low crops. On the other hand, it will often be desirable to be able to modify the wheel-base of the apparatus. FIGS. 3 and 4 show how this may be done for the drive wheels and the steering wheels respectively; the chassis 1 is connected to the drive wheels and the steering wheels by transverse bars 670 and 671 which each telescopically slidably receive two extension members 681 and 682 on the one hand and 683 and 684 on the other hand, which carry the wheels.

The position of the extension members in the bars may be controlled by keeper pins which can be housed in a plurality of openings in the extension members.

Figure 5:
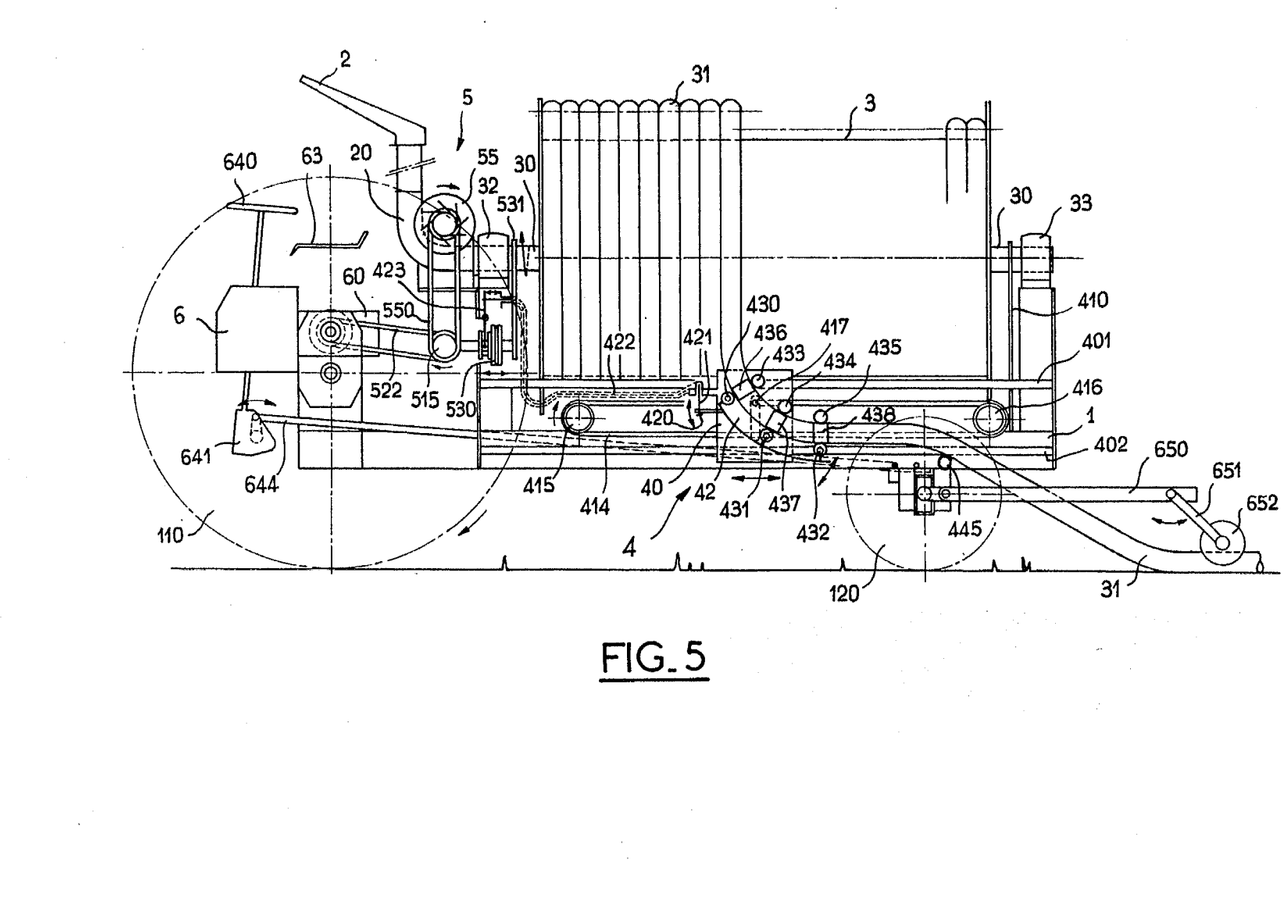
FIG. 5 is a side view of an alternative form of the first embodiment of the apparatus.
Figure 6:
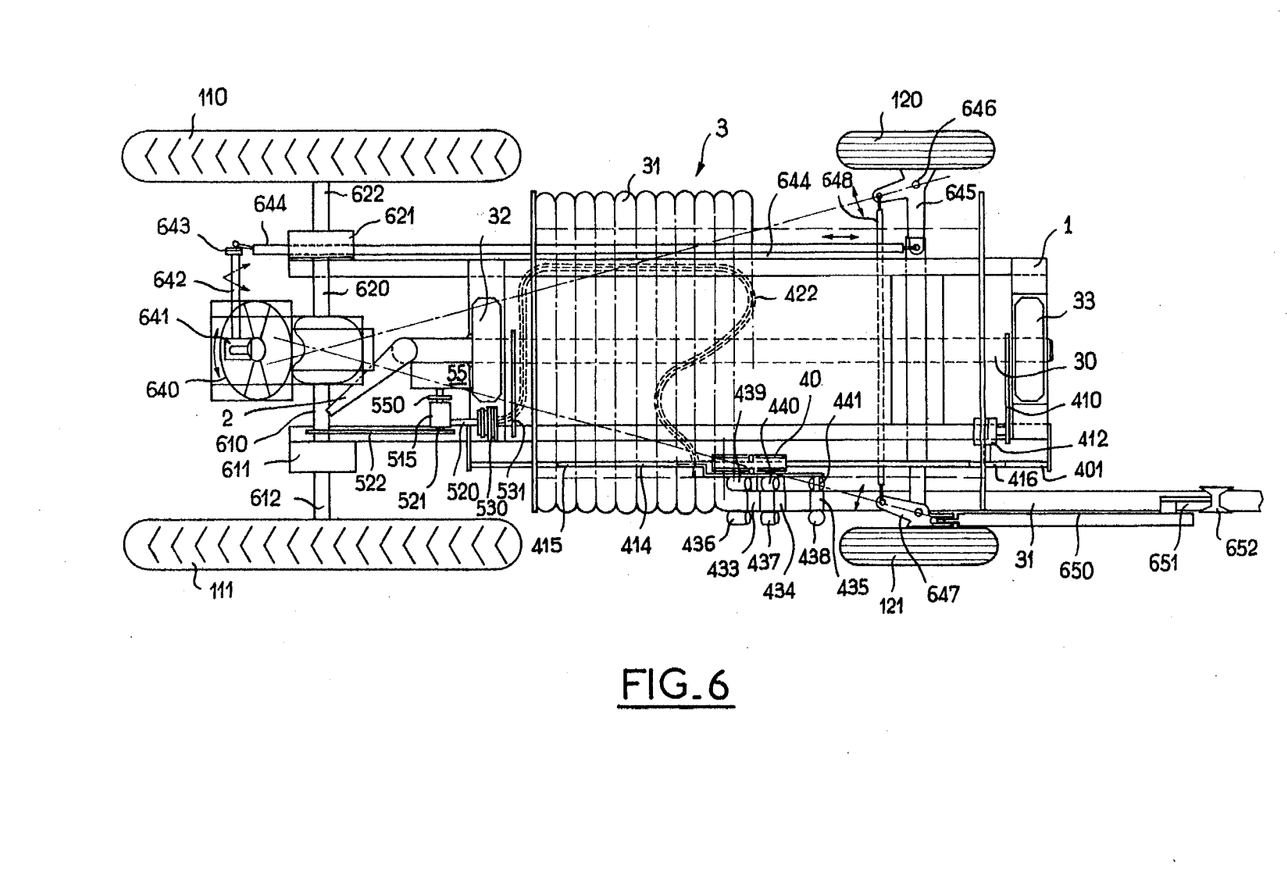
FIG. 6 is a plan view of the alternative embodiment shown in FIG. 5.

FIGS. 5 and 6 show an alternative form of the first embodiment of the invention, which differs therefrom only in regard to one point: in this alternative form, the hydraulic motor 5 comprises a turbine 55 which is mounted on the elbow-bent conduit 20; by way of pinions and chain 550, the turbine 55 drives a bevel gear assembly 515 which is similar to that of FIGS. 1 to 4. The remainder of the drive for the drum is arranged as described above.

Another embodiment of the invention will now be described with reference to FIGS. 7 to 9.

FIG. 7 shows the general view of this embodiment, showing the same general functions as in regard to FIGS. 1 to 6, with some differences in construction: a single jack 501 which is actuated by the power of the water supply actuates, by way of a pawl 511, a ratchet wheel 513 which is coupled to the drive wheels such as 111, and to the bevel gear assembly 515 which actuates the reel by way of a clutch which is different from the above-described clutch and which will be described with reference to FIGS. 8 and 9.

The possibility of slip in the drive to the reel and its reeling guide means is provided in this embodiment by varying the tension of a belt 531 which is passed around the periphery of one of the ends of the drum 3 and around a pulley 532 which is mounted on the output shaft 520 of the bevel gear assembly 515. The tension in the belt is defined by a roller 533 which is mounted on an arm 534 engaged by a spring 535.

The arm 534 is coupled to a lever 540 which is connected by a cable 541 to the pipe tension detecting means which is now mounted rearwardly of the rear wheel: the pipe passes over the grooved wheel 460 which is mounted on the chassis and then under a roller 461 which is mounted on an arm 462 which is pivoted on the chassis about the axis of the wheel 460. The arm 462 is extended at a right angle at 463, where the other end of the cable 541 is fixed (obviously, the cable is sheathed in its intermediate portion). Thus, when the tension in the pipe is excessive, the roller 461 lifts the arm 462 which pulls the cable and releases (FIG. 8) the tension applied to the belt 531 by the roller 533. The drum and its reeling guide means slow down or even stop, until the tension in the pipe returns to normal.

The reel and its reeling guide means may also be disengaged manually, by engaging the lever 540 on the hook member 545.

In this embodiment, the tension detecting means is no longer mounted on the reeling guide carriage. The curved pipe guide means are of a more simple construction: the carriage 40 of the reeling guide means now simply carries a pair of grooved rollers 450 and 451 whose axes are both disposed in the same horizontal plane. The carriage 40 is slidably guided by means of four rollers 452 to 455 which co-operate with guide members.

The relay roller 445 now supports the pipe 30 just above the rear wheel 121, which permits the pipe to be placed in the track of the wheels on that side and limits the space required on the ground.

As above, the directional guidance of the apparatus is in relation to the pipe; the concave roller 652 carried by the arm 650 (FIG. 7) which co-operates with the steering wheels is urged against the pipe by its own weight (or by an added weight), in this embodiment. It carries a detector 655 which can co-operate with a stop member placed at the end of the field, to stop the apparatus.

Many means described herein may be replaced by equivalent means: thus, the reeling guide means and the pipe guide means of FIGS. 1 to 6 may be replaced by those shown in FIGS. 7 to 9. Conversely, the clutch means of FIGS. 7 to 9 may be used in place of that shown in FIGS. 1 to 6. In every case, the tension detector may be mounted either on the chassis (FIGS. 7 to 9) or on the reeling guide carriage (FIGS. 1 to 6). Moreover, in the foregoing description, it is always the reeling guide carriage which carries the curved pipe guide means, but it will be appreciated that the two functions may be separated, the curved pipe guide means then being mounted on the chassis. From another point of view, the reeling guide means may be disposed elsewhere than on the side of the apparatus, for example below the apparatus, without losing the advantage that the pipe is laid down in a fixed position relative to the wheels.

Moreover, in the foregoing description, with the lateral reeling guide means, the pipe is laid down in the vicinity of the wheels, which does not exclude a certain distance from the wheels, between the wheels or outwardly thereof. Moreover, for example with a reeling guide means which is disposed above or below the apparatus, it is also possible for the pipe to be laid down in a selected predetermined fixed position somewhere between the wheels.

Other means equivalent to those of the present invention may be found in French Pat. No. 76 23 022 and its addition No. 77 22 509 referred to above.

As regards the hydraulic drive, it is possible to use two separate motors, for example two jacks associated with two pawl-ratchet wheel assemblies, for respectively controlling the displacement of the apparatus on the one hand and the rotary movement of the drum with its reeling guide means on the other hand. The slip in the drive to the drum and the reeling guide means may then be easily achieved by inserting a calibrated valve in the water circuit which supplies their jack; if the tension in the pipe is excessive, the drum resists the drive and the pressure of the water then becomes insufficient to drive the drum, until the pipe tension becomes normal again.

In the foregoing description, it was assumed that the axis of the drum is parallel to the plane of the drive wheels. For some uses, it may be inclined relative to said plane, in one direction or the other, provided that the curved pipe guide means always make it possible for the pipe to be laid down in a fixed position relative to the wheels.

A form of the pipe of flexible material which can be used in the present invention, which is preferred at the present time, is a pipe of plasticised polyvinyl chloride reinforced with polyester fibres.

We claim:

1. In a vehicular spraying apparatus having a wheeled vehicle chassis displaceable along a given direction and a spray-producing element carried by the vehicle chassis, the element communicating through an elongated flexible pipe to a source of water, the pipe being dispensed from the vehicle chassis and taken up on the chassis in response to movement of the chassis relative to the source, the improvement comprising:

a reel carried by the chassis and being mounted for rotation thereon to dispense and take up the pipe, the axis of rotation of the reel being disposed substantially along the direction of motion of the chassis, the reel and vehicle moving together along the same path during dispensing and taking up of the pipe;

reeling guide means carried by the chassis for controlling the winding movement of the pipe from and onto the reel, the reeling guide means including a carriage which engages the pipe and is displaceable relative to the chassis in a direction substantially parallel to the axis of rotation of the reel in response to the rotary motion of the reel in order to vary the location on the reel at which the pipe winds from and onto said reel so that the pipe is disposed on the reel in regular layers;

means for sensing the pulling force on the pipe;

means for driving the apparatus and the reel in order to adjust the length of the pipe which is unwound between the source and the apparatus when said apparatus is moving, said driving means being responsive to said sensing means to vary the driving rate of the reel with respect to that of the apparatus; and, pipe-guide means for defining a curved path along which the pipe moves when being dispensed from the reel, the path passing from a direction substantially perpendicular to the axis of the reel at the location where the pipe leaves the reel to a direction which is substantially parallel to the direction of motion of the apparatus as the pipe is dispensed from the apparatus.

2. A spraying apparatus according to claim 1 characterised in that the pipe guide means comprise at least one roller which is mounted on the carriage of the reeling guide means and over which the pipe passes.

3. A spraying apparatus according to claim 1 characterised in that the reeling guide means extends on one side of the apparatus, parallel to the axis of rotation of the reel.

4. A spraying apparatus according to claim 3 wherein the chassis is supported by two pairs of wheels, one pair at the front and the other pair at the rear, where the pipe issues from the apparatus, characterised in that the pipe guide means further comprise a relay roller which is so positioned that the pipe is unwound on the ground in the vicinity of the track of one of the wheels.

5. A spraying apparatus according to claim 4 wherein the front wheels are large wheels and the rear wheels are small wheels, characterised in that the relay roller supports the pipe above one of the small rear wheels and the pipe is unwound on the ground, in the track of said wheel.

6. A spraying apparatus according to claim 1 characterised in that the means for driving the apparatus and the reel comprise a motor, a first mechanical connection between the motor and the drive wheels of the chassis, and a second mechanical connection which permits slip between the motor and the reel and the reeling guide means, and that there is provided on the path of the pipe, a means which is sensitive to the pulling force applied to the pipe, said means controlling the slip in the second mechanical connection so that the pipe is wound on under a substantially constant tension.

7. A spraying apparatus according to claim 6 characterised in that the reeling guide means comprises an endless chain which is driven at the same time as the reel and provided with a lug which entrains a carriage movable on straight guide members, said carriage supporting the curved pipe guide means.

8. A spraying apparatus according to claim 7 characterized in that the pulling force-sensitive means is mounted on the carriage of the reeling guide means and comprises a lever which is pivotal on said carriage about an axis substantially perpendicular to the axis of the reel, said lever supporting at least one pair of rollers for guiding the pipe in a curved path, and at least one supplementary roller which rests on the pipe at the exit end of the apparatus.

9. A spraying apparatus according to claim 6 characterised in that the means responsive to the pulling force applied to the pipe is mounted on the portion of the pipe which issues from the apparatus, rearwardly of the rear wheels.

10. A spraying apparatus according to claim 6 characterised in that the slip incorporated in the second mechanical connection is provided by a clutch.

11. A spraying apparatus according to claim 6 characterised in that the slip incorporated in the second mechanical connection is provided by release of a tensioning roller which is disposed on a belt drive for the reel and the reeling guide means.

12. A spraying apparatus according to claim 6 characterised in that the motor for driving the apparatus and the reel is a hydraulic motor actuated by the pressurised spraying liquid, the spraying operation being effected as the pipe is wound on and as the apparatus is moved towards the water supply station, by the action of said hydraulic motor.

13. A spraying apparatus according to claim 6 characterised in that it comprises an independent drive motor capable of driving one at least of the components comprising the drive wheels and the reel.

14. A spraying apparatus according to claim 1 characterised in that it comprises a directional guide means comprising a sensing arm which co-operates with the portion of the pipe which is unwound on the ground.

15. A spraying apparatus according to claim 1 characterised in that the pipe is made of flexible material and is provided at its ends with non-return valves which normally keep it under pressure.

16. The spraying apparatus according to claim 1 wherein the sensing means is disposed on the portion of the curved path which is substantially parallel to the direction of motion of the apparatus.

* * * * *